(12) United States Patent
Biewer et al.

(10) Patent No.: US 11,938,753 B2
(45) Date of Patent: Mar. 26, 2024

(54) WHEEL HUB, SYSTEM CONSISTING OF A BRAKE DISK AND A WHEEL HUB, AND A METHOD FOR MOUNTING A BRAKE DISK ON A WHEEL HUB

(71) Applicant: SAF-HOLLAND GmbH, Bessenbach (DE)

(72) Inventors: Frederik Biewer, Haibach (DE); Jonas Mattern, Alzenau (DE); Muhammet Arpaci, Aschaffenburg (DE); Petr Tukac, Aschaffenburg (DE); Stefan Wallmeier, Goldbach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 606 days.

(21) Appl. No.: 16/630,731

(22) PCT Filed: May 24, 2018

(86) PCT No.: PCT/EP2018/063632
§ 371 (c)(1),
(2) Date: Jan. 13, 2020

(87) PCT Pub. No.: WO2019/015830
PCT Pub. Date: Jan. 24, 2019

(65) Prior Publication Data
US 2021/0078363 A1      Mar. 18, 2021

(30) Foreign Application Priority Data
Jul. 18, 2017   (DE) ..................... 10 2017 116 131.7

(51) Int. Cl.
*B60B 27/00*      (2006.01)
*B60B 27/02*      (2006.01)
(Continued)

(52) U.S. Cl.
CPC .......... *B60B 27/0052* (2013.01); *B60B 27/02* (2013.01); *B60B 2320/10* (2013.01);
(Continued)

(58) Field of Classification Search
CPC ......... F16D 65/123–128; F16D 65/847; F16D 2065/1384; B60B 27/0052; B60B 27/02;
(Continued)

(56) References Cited

U.S. PATENT DOCUMENTS 6,880,682 B2      4/2005   Gotti et al.
7,111,911 B2 *   9/2006   Baumgartner ........ F16D 65/847
                                                          188/218 XL
(Continued)

FOREIGN PATENT DOCUMENTS

CN        203641347 U         6/2014
DE        10133985 A1 *      10/2002  ............. B60B 27/02
(Continued)

OTHER PUBLICATIONS

European Patent Office; International Search Report; dated Aug. 22, 2018.

*Primary Examiner* — Christopher P Schwartz
(74) *Attorney, Agent, or Firm* — Price Heneveld LLP

(57) ABSTRACT

A wheel hub includes an outer collar region, as seen in the radial direction, and an inner core region, as seen in the radial direction, wherein, as seen in the axial direction, the inner core region is thicker than the outer collar region, and wherein, in the inner core region, the wheel hub has a substantially axially running primary recess for the connection of a brake disk.

17 Claims, 8 Drawing Sheets

(51) Int. Cl.
  *F16D 65/02* (2006.01)
  *F16D 65/12* (2006.01)
(52) U.S. Cl.
  CPC . *B60B 2900/111* (2013.01); *B60B 2900/3312* (2013.01); *B60B 2900/513* (2013.01); *F16D 65/123* (2013.01); *F16D 2065/1384* (2013.01)
(58) Field of Classification Search
  CPC .......... B60B 2320/10; B60B 2900/111; B60B 2900/3312; B60B 2900/513
  USPC ................ 188/18 A, 218 XL; 301/6.1, 105.1
  See application file for complete search history.

(56) References Cited

U.S. PATENT DOCUMENTS

| | | | | |
|---|---|---|---|---|
| 8,037,980 | B2* | 10/2011 | Pahle | F16D 65/847 |
| | | | | 188/218 XL |
| 8,061,785 | B2* | 11/2011 | Ilg | F16D 65/12 |
| | | | | 188/218 XL |
| 8,287,052 | B2* | 10/2012 | Fakhoury | B60B 27/0057 |
| | | | | 301/105.1 |
| 2004/0207249 | A1 | 10/2004 | Baumgartener et al. | |
| 2009/0260933 | A1 | 10/2009 | Pahle | |
| 2012/0247884 | A1 | 10/2012 | Root et al. | |
| 2018/0340584 | A1* | 11/2018 | Wittlinger | B60T 1/065 |
| 2020/0180357 | A1* | 6/2020 | Wallmeier | F16D 65/12 |
| 2021/0094347 | A1* | 4/2021 | Brunsch | B60B 27/0057 |
| 2022/0001693 | A1* | 1/2022 | Hartmann | B60B 27/0052 |

FOREIGN PATENT DOCUMENTS

| | | |
|---|---|---|
| DE | 10 2007 008 725 B3 | 6/2008 |
| DE | 10 2008 014 857 A1 | 9/2009 |
| DE | 10 2015 016 036 A1 | 6/2017 |
| WO | 9513198 A1 | 5/1995 |
| WO | 9513488 A1 | 5/1995 |
| WO | 02087901 A1 | 4/2002 |
| WO | 2007118665 A1 | 10/2007 |
| WO | 2009146722 A1 | 12/2009 |

* cited by examiner

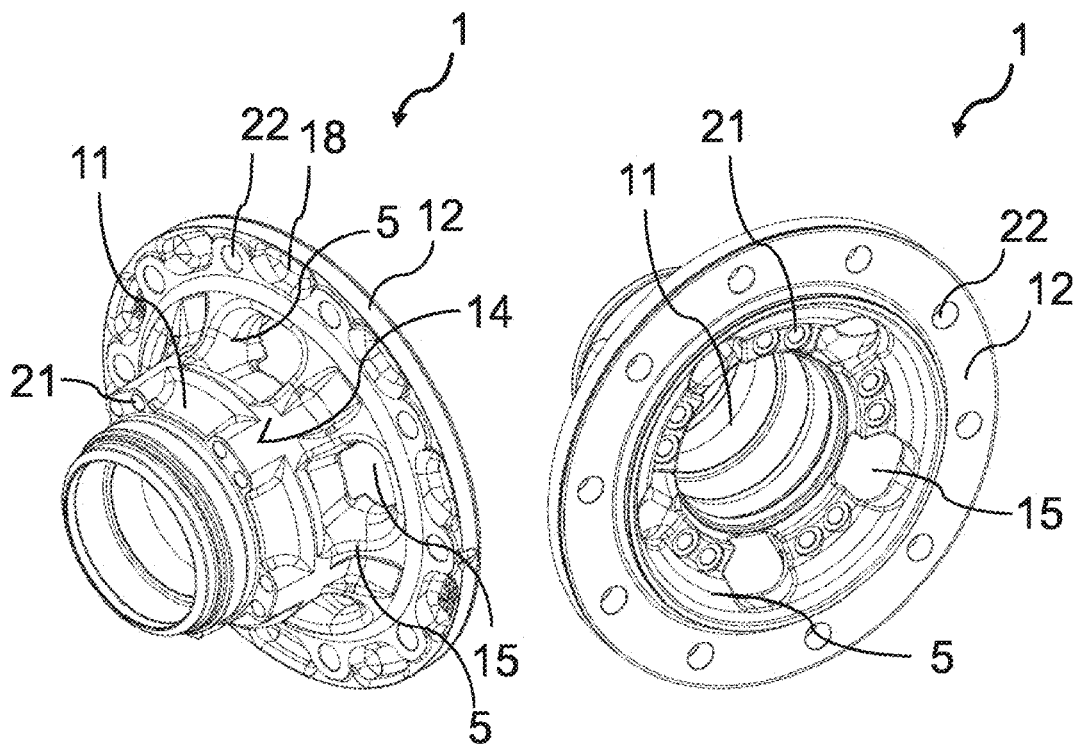
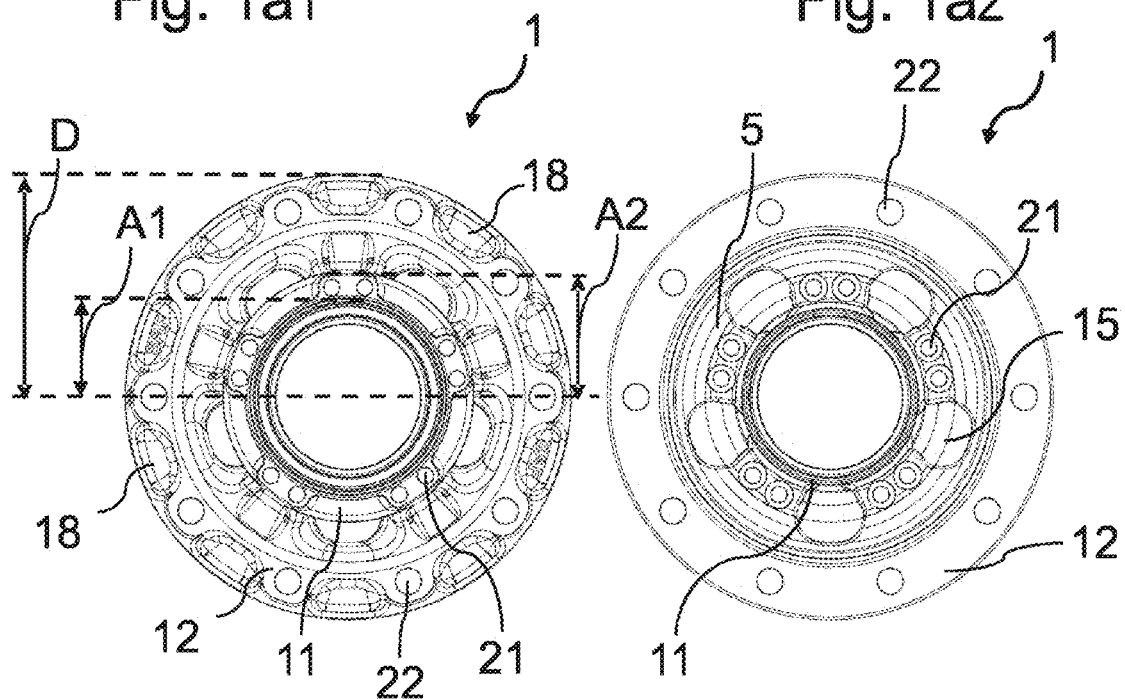
Fig. 1a1  Fig. 1a2  Fig. 1b1  Fig. 1b2

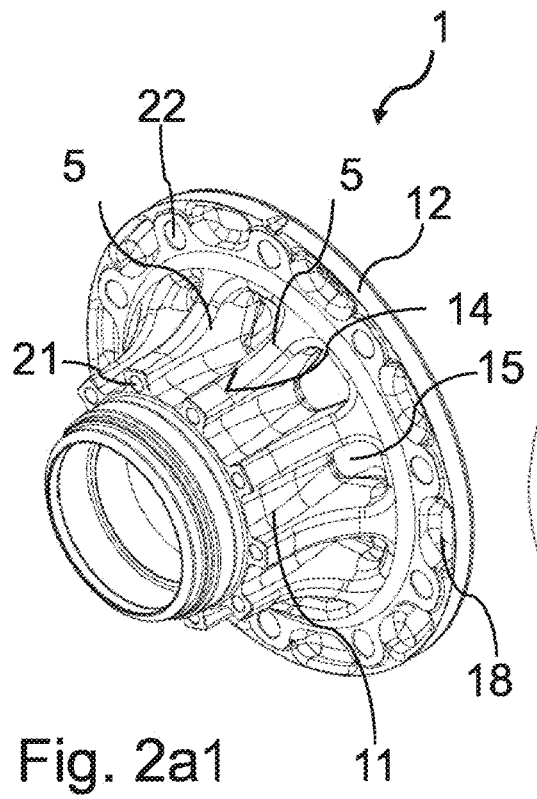
Fig. 2a1
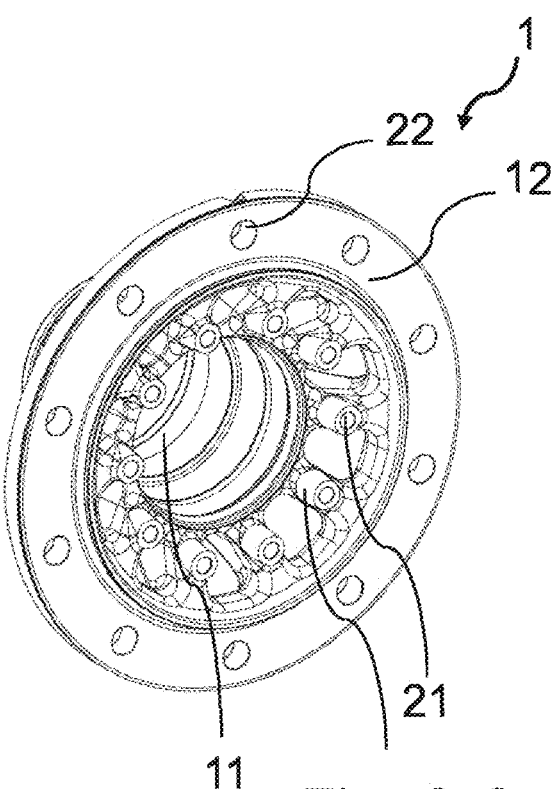
Fig. 2a2
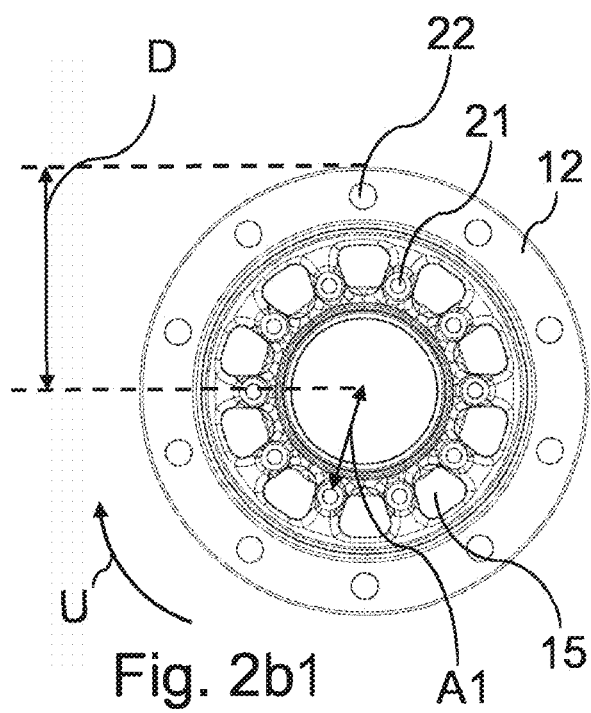
Fig. 2b1
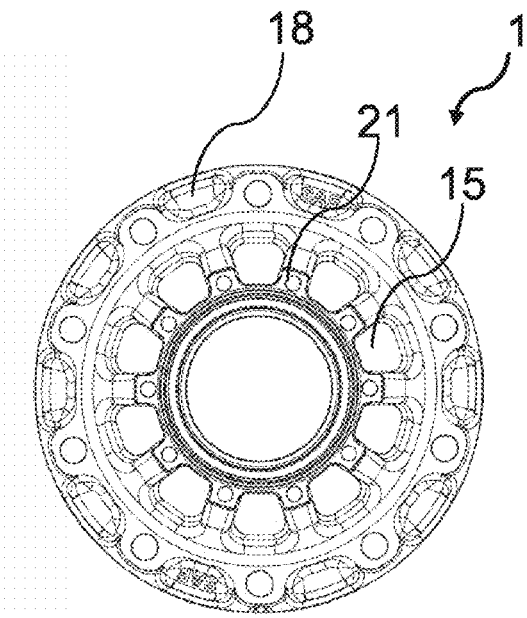
Fig. 2b2

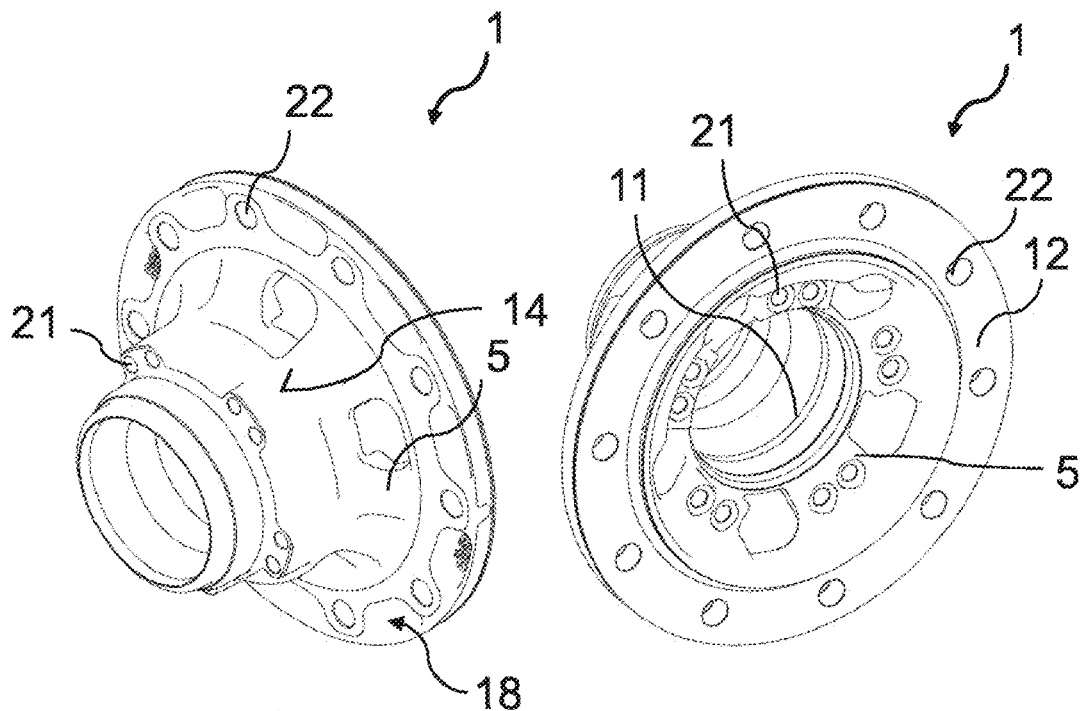
Fig. 3a1  Fig. 3a2
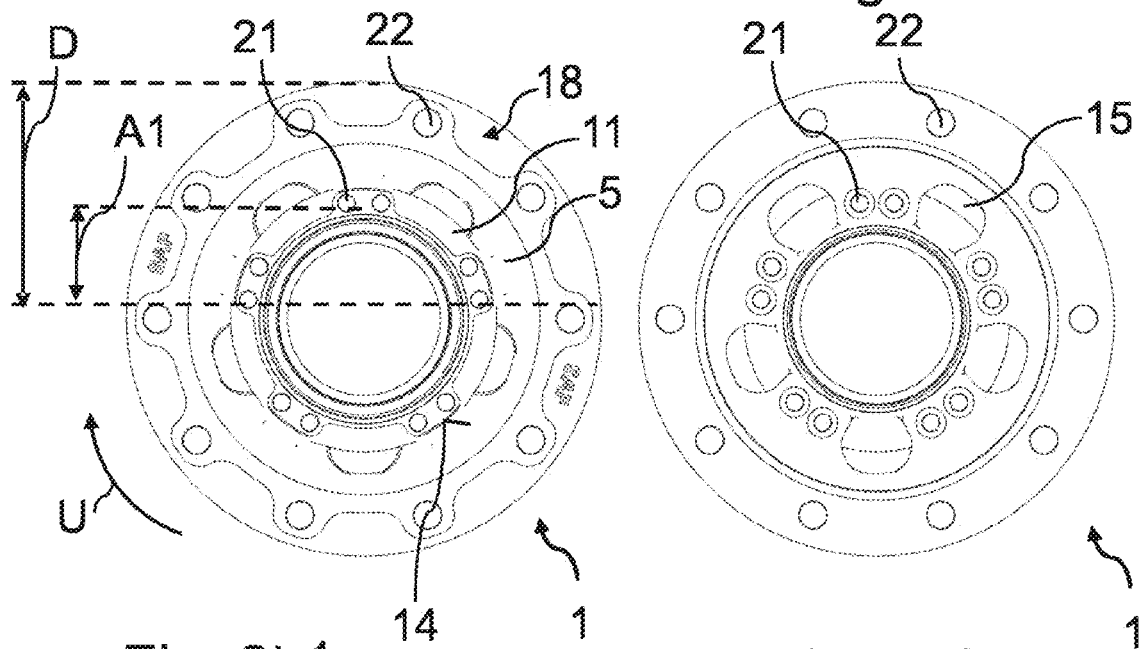
Fig. 3b1  Fig. 3b2

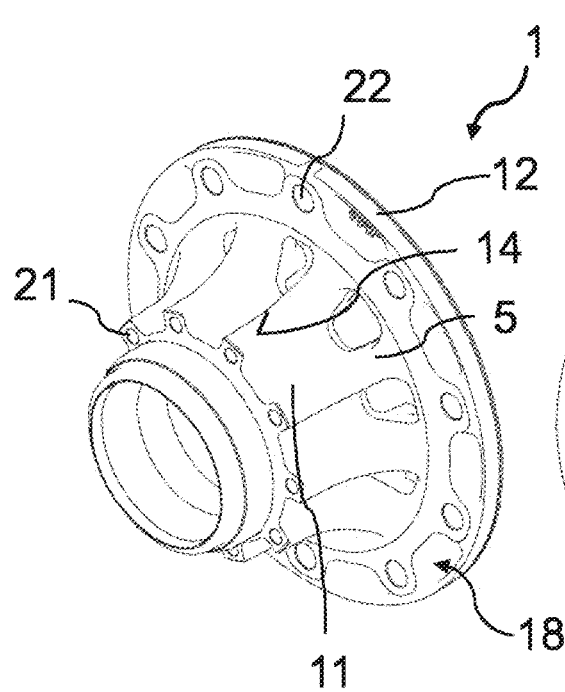
Fig. 4a1
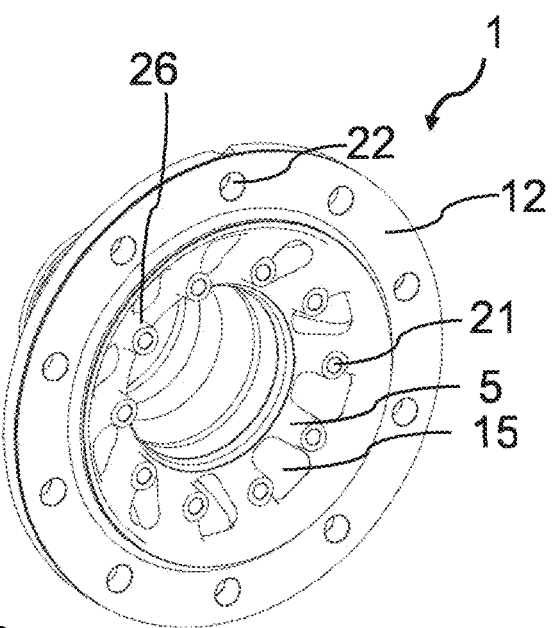
Fig. 4a2
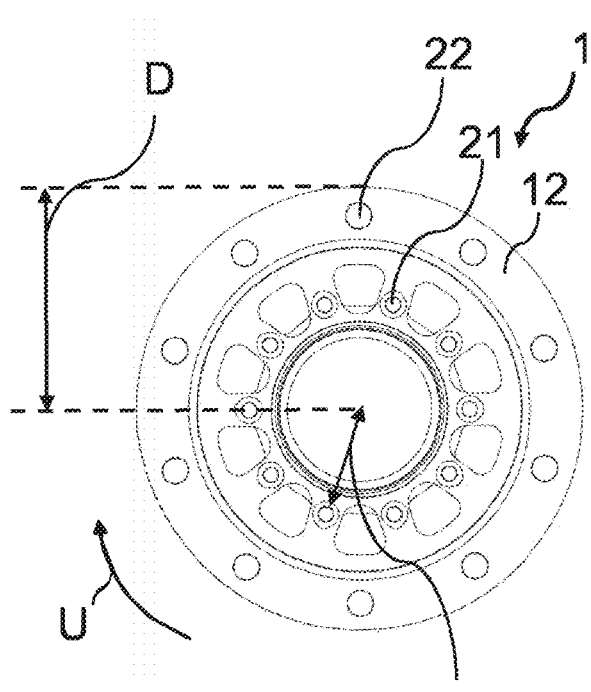
Fig. 4b1
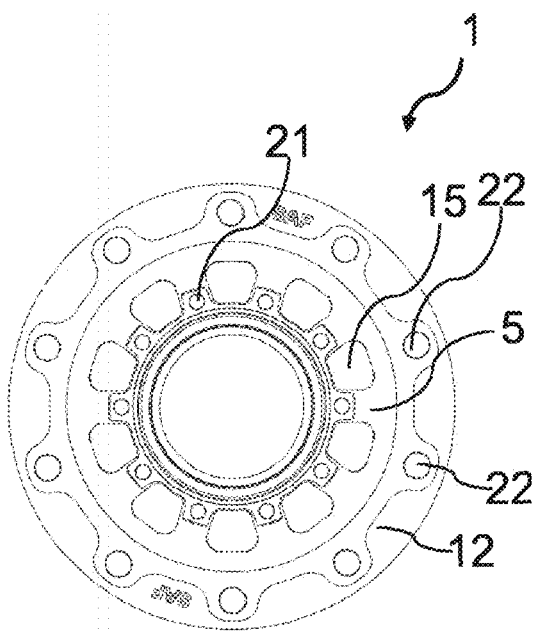
Fig. 4b2

WHEEL HUB, SYSTEM CONSISTING OF A BRAKE DISK AND A WHEEL HUB, AND A METHOD FOR MOUNTING A BRAKE DISK ON A WHEEL HUB

BACKGROUND OF THE INVENTION

The present invention relates to a wheel hub, to a system consisting of a brake disk and a wheel hub, and to a method for mounting a brake disk on a wheel hub.

Wheel hubs are well known from the prior art. They serve for connecting a wheel to an axle element, for example to an axle of a utility vehicle. Brake disks are conventionally connected in this case to the wheel hub for rotation therewith. The brake disks are typically screwed from the brake disk side to the wheel hubs. As a result, a clamping length, i.e. an overall thickness which is formed in the connecting direction from the connected elements and a fastening means serving for the connection, is limited by the generally flat brake disk element or adapter element and a construction space, which faces away from the visible side of the mounted wheel hub, on the vehicle. The consequence is that the fastening means, for example a screw, has to have an appropriately high strength for applying required bracing forces. In addition, no further increase of the braking torque can be realized.

In view of the prior art described, it is therefore an object of the present invention to provide an improved wheel hub with which in particular a clamping length which is increased in relation to the prior art can be realized when the brake disk is connected to the wheel hub.

SUMMARY OF THE INVENTION

According to the invention, a wheel hub is provided which comprises an outer collar region, as seen in the radial direction, and an inner core region, as seen in the radial direction, wherein the inner core region has a greater extent in the axial direction than the outer collar region (i.e., as seen in the axial direction, the inner core region is thicker than the outer collar region), and wherein, in the inner core region, the wheel hub has a substantially axially running primary recess for connecting a brake disk. The positioning according to the invention of the primary recess permits greater clamping lengths in comparison to the prior art. This makes it advantageously possible to realize higher bracing forces which, in turn, permit higher braking torques. In addition, thermal effects, caused by the production of heat in the brake disk during braking, can be more effectively compensated for in comparison to wheel hubs, the primary recesses of which allow smaller clamping lengths for connecting the brake disk. In principle, a collar region should be understood as meaning an end of the wheel hub in the shape of an annular disk or in the shape of a border. In the mounted state of the wheel hub, the collar region forms the outermost circumferential region of the wheel hub, with which the wheel hub preferably ends toward a side, as seen in the radial direction and axial direction. The collar region is advantageously designed as a connection region for a wheel rim or serves for the arrangement of a wheel rim. For example, the ratio of the radial extent of the collar region to the radius of the wheel hub assumes a value of between 0.1 and 0.3, preferably of between 0.15 and 0.25 and particularly preferably of between 0.21 and 0.24. In the mounted state, the collar region faces the visible side of the vehicle. In particular, it is provided that the collar region, as seen in the radial direction, substantially has a constant thickness, as measured in the axial direction. A thickness is understood as meaning here in particular that extent of the collar region which is taken up by the collar region rotating about an axis of rotation during operation. Possible local offsets are thus not taken into consideration during the determination of the thickness. "Substantially axially running" can be understood here as meaning that the decisive direction should form an angle of at maximum 15°, preferably of at maximum 10° and particularly preferably of at maximum 5° with the ideal axial direction. The ideal axial direction is in particular the direction of the wheel axle or the direction along the axis of rotation of the wheel hub. Furthermore, it is provided that the core region, assuming the radial direction, changes its axially measured thickness. The core region preferably comprises a central cavity which is provided for receiving an axle element. The core region is provided in particular for contact with the axle element and, in the mounted state, encases the axle element, for example an axle stub, at least in regions. Furthermore, it is preferably provided that the core region and the collar region directly adjoin each other in the radial direction or merge into each other. It is preferably provided that the ratio of the radial extent of the core region to the radius of the wheel hub assumes a value of between 0.3 and 0.7, preferably of between 0.35 and 0.55 and particularly preferably of between 0.4 and 0.5. It is preferably provided that the primary recess is a bore, in particular a through bore. Furthermore, it is preferably provided that the wheel hub is provided for connecting a flat brake disk, for example a brake disk of a thickness of 1 to 3 cm in the axial direction. It is also conceivable that the primary recess is arranged in the half facing the axis of rotation, preferably in a first third facing the axis of rotation or particularly preferably in a first quarter of the core region or of the wheel hub facing the axis of rotation. In particular, it is provided that the wheel hub is formed in one piece or integrally, i.e. the wheel hub is not composed of a plurality of components, but rather brake disk, axle and wheel or wheel rim can be connected to a single-piece component, i.e. the wheel hub. The wheel hub is, for example, forged or cast in one piece.

It is preferably provided that the core region comprises substantially radially running rib elements. The rib elements, as seen in the axial direction, preferably run in regions parallel to the wheel axle. At their end facing the collar region, the rib elements are curved radially outward. The rib elements make it advantageously possible to dispense with a solid core region, and therefore weight and material can be saved at the wheel hub. It is particularly preferably provided that the rib elements, as seen in the revolving direction, open on the cantilever element in a region in which no secondary recesses are provided. The secondary recesses preferably serve for connecting the wheel or the wheel rim to the wheel hub. The rib element preferably opens centrally between two secondary recesses which are adjacent to each other in the revolving direction. As a result, with a homogeneous distribution of stress by means of the rib elements, a reduction in the weight of the wheel hub at an identical axle load can be achieved. In this connection, "substantially radially running" should be understood as meaning that the rib elements should form an angle of at maximum 10°, preferably of at maximum 5° and particularly preferably of at maximum 2° with the ideal radial direction. The ideal radial direction is in particular the radial direction with respect to the wheel axle or with respect to the axis of rotation of the wheel hub.

The rib elements expediently connect the core region to the collar region, in particular exclusively. "Connect" can be understood here as meaning, inter alia, that the rib elements are configured, in particular exclusively, for transmitting force and/or torque between the core region and the collar region. By this means, a particularly compact wheel hub can be achieved. In other words, this can mean that the rib elements form that part of the core region which is connected to the collar region.

It is expediently provided that a rib element has a plurality of primary recesses. For example, precisely two primary recesses are provided in the rib element, in particular in each rib element. As a result, a brake disk contact surface can be advantageously increased since two primary recesses can share a common brake disk contact surface. The primary recesses which are realized as a pair in a rib element are preferably arranged centrally, as seen in the revolving direction, between two adjacent secondary recesses. It is provided here, for example, that, as seen in the revolving direction, a rib element or no rib element opens in an alternating manner between in each case two adjacent secondary recesses. The axially running primary recesses are preferably arranged, as seen in the radial direction, in that region of the rib element in which the rib elements, in particular lateral outer surfaces assigned to the rib element, run substantially axially with respect to the wheel axle. The primary recesses can be admitted into the rib element at the wheel axle end thereof facing the collar region.

Alternatively, it is conceivable for each rib element to have precisely or merely one primary recess. In comparison to the rib elements having the plurality of primary recesses, narrower rib elements can thereby be realized. The rib elements preferably open centrally, as seen in the revolving direction, in a region between two mutually adjacent secondary recesses. The primary recesses are preferably arranged, as seen in the radial direction, in that region of the rib element in which the rib elements, in particular lateral outer surfaces assigned to the rib element, run substantially axially with respect to the wheel axle. In other words: the primary recess is admitted into the rib element at the wheel axle end thereof facing the collar region.

In a further embodiment of the present invention, it is provided that the collar region has a material thinning. The material thinning advantageously enables the entire weight of the wheel hub to be reduced. The material thinning is preferably provided as an offset between two adjacent secondary recesses, said offset expediently extending axially into the collar region. In particular, it is provided that the offsets are arranged on that side of the collar region which, in the mounted state, faces the brake disk. As a result, that side of the collar region which faces away from the brake disk can advantageously be configured flat in order to provide as flat a contact surface as possible for connection of the wheel. A ratio between a local thickness of the collar region and a thickness of the collar region, as measured, for example, in the region of the secondary recesses, preferably assumes a value of between 0.05 and 0.5, preferably of between 0.1 and 0.25 and particularly preferably of between 0.15 and 0.2. It has surprisingly turned out that such material thinnings, in particular for ratios of between 0.15 and 0.2, do not negatively impair the stability of the collar region.

It is preferably provided that the outer collar region has a secondary recess, wherein the primary recess extends further in the axial direction than the secondary recess. The same recess with which a greater clamping length can be realized is thus provided for the connection of the brake disk since the secondary recesses are arranged in the thinner collar region.

It is expediently provided that a ratio between an extent of the primary recess, as measured in the axial direction, to an extent of the secondary recess, as measured in the axial direction, assumes a value of between 0.05 and 0.45, preferably 0.01 and 0.35 and particularly preferably 0.01 and 0.2.

In a further embodiment of the present invention, it is provided that the primary recesses and the secondary recesses are arranged offset with respect to one another in the axial direction. For example, the opening of the primary recess that faces the collar region does not end flush with a side of the collar region. The primary recess is preferably set back, as seen in the axial direction, with respect to the secondary opening or in relation to the collar region. As a result, fastening elements, for example screws, coming from an outer side of the vehicle can be arranged on the wheel hub in such a manner that they do not protrude in relation to the collar region in the axial direction. The fastening elements can therefore be arranged in an at least partially protected manner.

Expediently, at least one primary recess, preferably all of the primary recesses, completely penetrates/penetrate the core region and/or the wheel hub. Particularly simple mounting of the brake disk can thereby be achieved. In particular, it can thereby be achieved that the brake disk can be mounted or tightened from the opposite side of the wheel hub. The primary recesses are preferably arranged offset in a revolving direction with respect to the secondary recesses. A particularly mechanically loadable wheel hub can thereby be achieved.

It is expediently provided that a ratio between an extent of the primary recess, as measured in the axial direction, to an overall extent of the wheel hub in the axial direction assumes a value of between 0.5 and 0.98, preferably 0.75 and 0.95 and particularly preferably of between 0.78 and 0.88. When the ratio of between 0.78 and 0.88 is realized, as large a clamping length as possible can be achieved in an advantageous manner without the construction-space-filling extent of the wheel hub having to be increased in the axial direction.

According to a further embodiment of the present invention, it is provided that a ratio between a radial distance between the axis of rotation and the primary recess and a radius of the wheel hub, as measured in the radial direction, assumes a value of between 0.3 and 0.6, preferably of between 0.35 and 0.55 and particularly preferably of between 0.4 and 0.5. By means of the realization of these ratios, the primary recess can be arranged as close as possible to the wheel axle in the wheel hub. The thickness, as measured in the axial direction, of the wheel hub, as seen in the radial direction, is at the greatest here, and therefore correspondingly large clamping lengths can be realized. Possible profilings of the wheel hub on the side of the core region that faces the cavity are preferably taken into consideration in the arrangement of the primary recesses.

In a further embodiment of the present invention, it is provided that a ratio between the radial distance between the axis of rotation and the primary recess and a length of the primary recess extending in the axial direction assumes a value of between 0.65 and 0.85, preferably between 0.7 and 0.78 and particularly preferably between 0.72 and 0.77. In these designs, the primary recess extends further than its radial distance between the axis of rotation and the primary recess. In particular for the ratio between 0.72 and 0.77, primary recesses are obtained for clamping lengths which are as large as possible, the primary recesses also being at a comparatively small distance from the axis of rotation.

It is preferably provided that a clear region is arranged, in particular in each case, between two rib elements, as seen in the revolving direction. The effect which can be achieved by this is that cooling air passes through the clear region(s) to the brake disk such that the latter is cooled.

In a preferred embodiment, the area which is in the revolving direction and is assigned to the rib elements is 0.3 to 0.5 times as large as the area which is assigned to the clear region. It has turned out that such large clear regions can be realized without the stability of the wheel hub being put at risk. By means of said—surprisingly possible—configuration, firstly a particularly lightweight wheel hub can be achieved and, in addition, said large clear regions make it possible to increase the cooling effect of the brake disk.

It is expediently provided that the primary recess, as seen in the radial direction, extends over the entire length of the rib element, or that the primary recess is at least partially formed by a sleeve-shaped partial region which protrudes from the rib element, preferably in the axial direction. By means of the complete extent of the primary recesses in the rib element, the fastening means provided for the connection can be introduced or guided in a comparatively simple manner and is at least partially, preferably mostly, arranged protected in the primary recess. In the case of the sleeve-shaped partial region, it is advantageously not required to configure the rib element parallel to the wheel axle over as long a distance as possible. That is to say, a greater freedom of configuration is obtained for the configuration of the rib elements since the sleeve-shaped partial region ensures the increased clamping length.

In a further embodiment of the present invention, it is provided that the primary recess opens toward one side in a brake disk contact surface, wherein the brake disk contact surface is preferably interrupted or continuous, as seen in the revolving direction. In the mounted state, the brake disk or an adapter element lies directly against the brake disk contact surface. In particular, it is provided that one end of the rib element provides a brake disk contact surface. In the case of a continuous brake disk contact surface, a continuous flat contact can be provided while, in the case of an interrupted brake disk contact surface, material and weight of the wheel hub can advantageously be saved.

According to the invention, a system consisting of a brake disk and a wheel hub according to the invention is likewise provided, wherein the brake disk is connectable or connected to the wheel hub, in particular to the brake disk contact surface, by means of a fastening means guided through the primary recess. All of the features described for the wheel hub according to the invention and the advantages thereof can expediently also be transferred to the system according to the invention consisting of the brake disk and the wheel hub, and vice versa. In particular, it is provided that the brake disk contact surface is arranged on that side of the wheel hub which lies opposite the collar region, as seen in the axial direction. Primary recesses can therefore be realized which extend in the axial direction between the brake disk contact surface and the collar region and therefore permit as large a clamping length as possible. In this case, the fastening means reaches in particular completely through the primary recess. The fastening means preferably comprises a screw and optionally a nut.

According to a further embodiment of the present invention, it is provided that a thread is provided on the brake disk side, for example in the brake disk or in the form of a nut lying against the brake disk. This permits the connection of the brake disk via a fastening means which is introduced into the primary recess from an outer side of the motor vehicle when the wheel hub is pulled onto the axle element during the assembly.

According to the invention, a method for mounting a brake disk on a wheel hub is likewise provided, comprising the steps of:
 providing a wheel hub according to the invention,
 introducing a fastening means into the primary recess, and
 connecting the brake disk to the wheel hub by means of the fastening means.

All of the features described for the wheel hub according to the invention and the advantages thereof can expediently likewise be transferred to the method according to the invention for mounting the brake disk on the wheel hub, and vice versa. The brake disk is preferably pulled onto the wheel hub until the brake disk lies against the brake disk contact surface. Subsequently, the brake disk is fastened by means of the fastening means by the fastening element being introduced into the primary recess and guided through the latter. The width of the primary recess, as seen in the radial direction, is preferably adapted to the corresponding dimensions of the fastening means, and therefore the fastening element fills the primary recess as completely as possible. As a result, the freedom of movement of the fastening element is advantageously restricted, which, for example, simplifies the mounting of the brake disk.

According to a further embodiment of the present invention, it is provided that the fastening means is introduced into the primary recess, from an outer side of the vehicle, in the wheel hub lying against the axle element.

BRIEF DESCRIPTION OF THE DRAWINGS

Further advantages and features emerge from the description below of preferred embodiments of the subject matter according to the invention with respect to the attached figures, in which:

FIGS. 1a1-1c show a wheel hub according to a first exemplary embodiment of the present invention;

FIGS. 2a1-2c show a wheel hub according to a second exemplary embodiment of the present invention;

FIGS. 3a1-3c show a wheel hub according to a third exemplary embodiment of the present invention; and FIGS. 4a1-4c show a wheel hub according to a fourth exemplary embodiment of the present invention.

DETAILED DESCRIPTION OF THE PREFERRED EMBODIMENTS

Figure 1C:
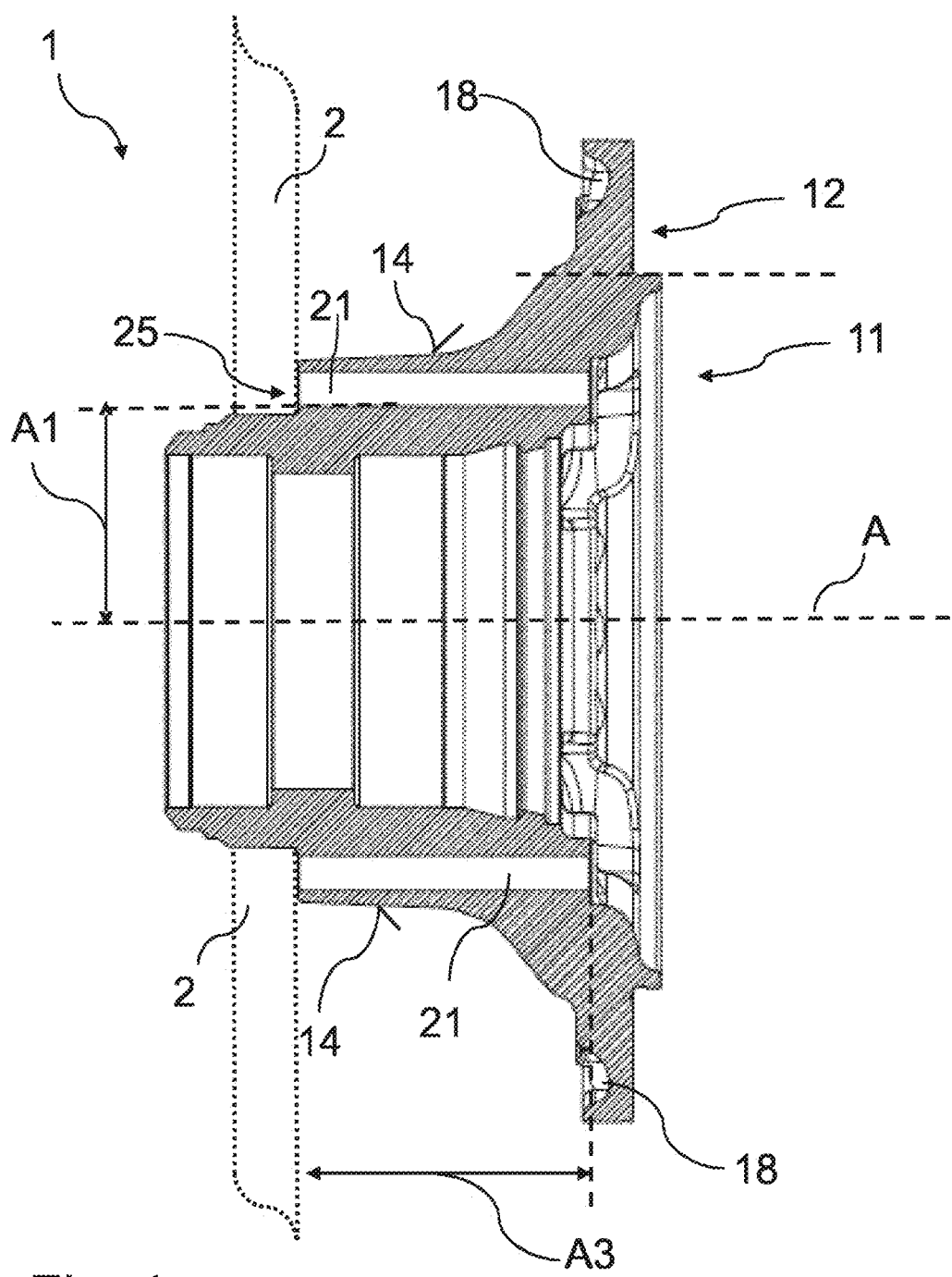

FIGS. 1a1 to 1c illustrate a wheel hub 1 according to a first exemplary embodiment of the present invention. FIGS. 1a1 and 1a2 illustrate two perspective views, FIGS. 1b1 and 1b2 a top view in each case of a rear side (on the left) and a front side (on the right) of the wheel hub 1 and FIG. 1c a sectional view. Such a wheel hub 1 serves to fasten a wheel to an axle element, for example to a journal, a shaft or an axle. In addition to the connection of the wheel, it is furthermore provided that a brake disk 2 is connected to the wheel hub 1 for rotation therewith. This preferably involves a wheel hub 2 for a utility vehicle. In particular, it is provided that the wheel hub 1 is configured in one piece or integrally. That is to say, both primary recesses 21 for connecting the brake disk 2 to the wheel hub 1 and secondary recesses 22 for connecting the wheel to the wheel hub 1 are provided on the single-piece wheel hub 1. Essential components of the integrally configured wheel hub 1 are an outer collar region 12, as seen in the radial direction, and an inner core region, as seen in the radial direction, wherein the core region 11 is thicker than the collar region 12. Preferably, the collar region 12 is configured substantially in the form of an annular disk, i.e. a thickness of the collar region 12, as measured in the axial direction, is substantially constant in the collar region 12, as seen in the radial direction. In particular, thickness is understood here as meaning a construction-space-filling extent of the collar region 12 rotating about the axis of rotation A during operation. In such a measurement, local material thinnings 18 in the revolving direction U are not taken into consideration. Such local material thinning 18, as seen in the revolving direction U, are preferably embedded at regular or equidistant distances in the collar region 12 in order thereby advantageously to reduce the overall weight of the wheel hub 1. For example, the material thinnings 18 are arranged between two adjacent secondary recesses 22. In this case, the material thinnings 18 are preferably offsets on the rear side of the collar region 12, i.e. on the side which, in the mounted state, faces the brake disk 2. In contrast to the collar region 12, the thickness of the core region 11, as measured in the axial direction, changes with increasing radial distance from the axis of rotation A. The thickness of the core region 11 is preferably at maximum in the region in which the wheel hub 1 in the mounted state lies against the axle element. Furthermore, it is provided that the core region 11 has substantially radially extending rib elements 5, wherein a clear region 15 is formed between two adjacent rib elements 5. In particular, it is provided that the rib elements 5 are configured in such a manner that they run in some regions parallel to the wheel axis A, as seen in the axial direction, and are curved radially outward toward the collar region 12. As a result, the wheel hub 1 widens, as seen in the axial direction. In the region in which the rib elements 5 run substantially parallel to the wheel axis A, the outer side of the rib elements 5 defines a lateral outer surface 14. It is preferably provided that a ratio between a distance A3 between the wheel axis A and the lateral outer surface 14 and the radius D of the wheel hub 1 has a value of between 0.3 and 0.8, preferably between 0.45 and 0.75, particularly preferably between 0.48 and 0.58. Furthermore, it is provided that a ratio between a length of the region in which the lateral outer surface 14 runs substantially parallel to the wheel axis A and an overall length of the wheel hub A in the axial direction a value of between 0.2 and 0.5, preferably between 0.25 and 0.45 and particularly preferably between 0.32 and 0.42. Furthermore, it is conceivable that the clear region 15, as seen in the radial direction, is arranged substantially in a line with the material thinning 18. Furthermore, it is preferably provided that the rib element 5 with a first end directly adjoins the collar region 12 and with a second end merges into the region in which the rib element 5 forms the lateral outer surface 14, which runs parallel to the wheel axis A. In particular, it is provided that the primary recess 21 via which the brake disk 2 is connected to the wheel hub 1 is arranged in the core region 11, preferably in a region which lies between the wheel axis A and the lateral outer surface 14. The primary recess 21 runs substantially axially here. Furthermore, it is provided, in the embodiment illustrated in FIG. 1, that the primary recess 21 extends over the entire rib element 5. By means of the arrangement of the primary recess 21 in the thicker core region 11, greater clamping lengths can advantageously be produced than if the primary recess 21 for connecting the brake disk 2 is arranged in the collar region 12. Said increased clamping length is advantageously associated with an increased bracing force which ultimately permits higher braking torques. In addition, thermal effects because of said structural arrangement of the primary recesses 21 can be comparatively readily compensated for. Furthermore, it is provided in the embodiment illustrated in FIG. 1, that the core region 11 has a brake disk contact surface 25 in which the primary recess 21 opens. In the mounted state, the brake disk 2 lies against the brake disk contact surface 25. In the present embodiment, it is provided that in each case two primary recesses 21 are assigned to a rib element 5 or run through the respective rib element 5. It is expediently provided that the ratio between a radial distance A1 between the axis of rotation A and the primary recess 21 and a radius D of the wheel hub 1, as measured in the radial direction, assumes a value of between 0.6 and 0.3, preferably of between 0.55 and 0.35 and particularly preferably of between 0.4 and 0.5. Furthermore, it is provided that the rib elements 5 are textured on the outer side in the radial direction. As a result, further material savings can be realized in a targeted manner, the material savings having a positive effect on the overall weight of the wheel hub 1 in a positive manner.

FIG. 1c illustrates the wheel hub 1 in a sectional view. It is preferably provided that a ratio between the radial distance A1 between the axis of rotation A and the primary recess 21 and a length of the primary recess 21 extending in the axial direction assumes a value of between 0.65 and 0.85, preferably of between 0.7 and 0.78 and particularly preferably of between 0.72 and 0.77. The primary recess 21 extends here from a first opening of the brake disk contact surface 25 as far as a second opening on the opposite side, as seen in the axial direction. The second opening lies here level with the collar region 12 without ending flush with a side of the collar region 12.

Figure 2C:
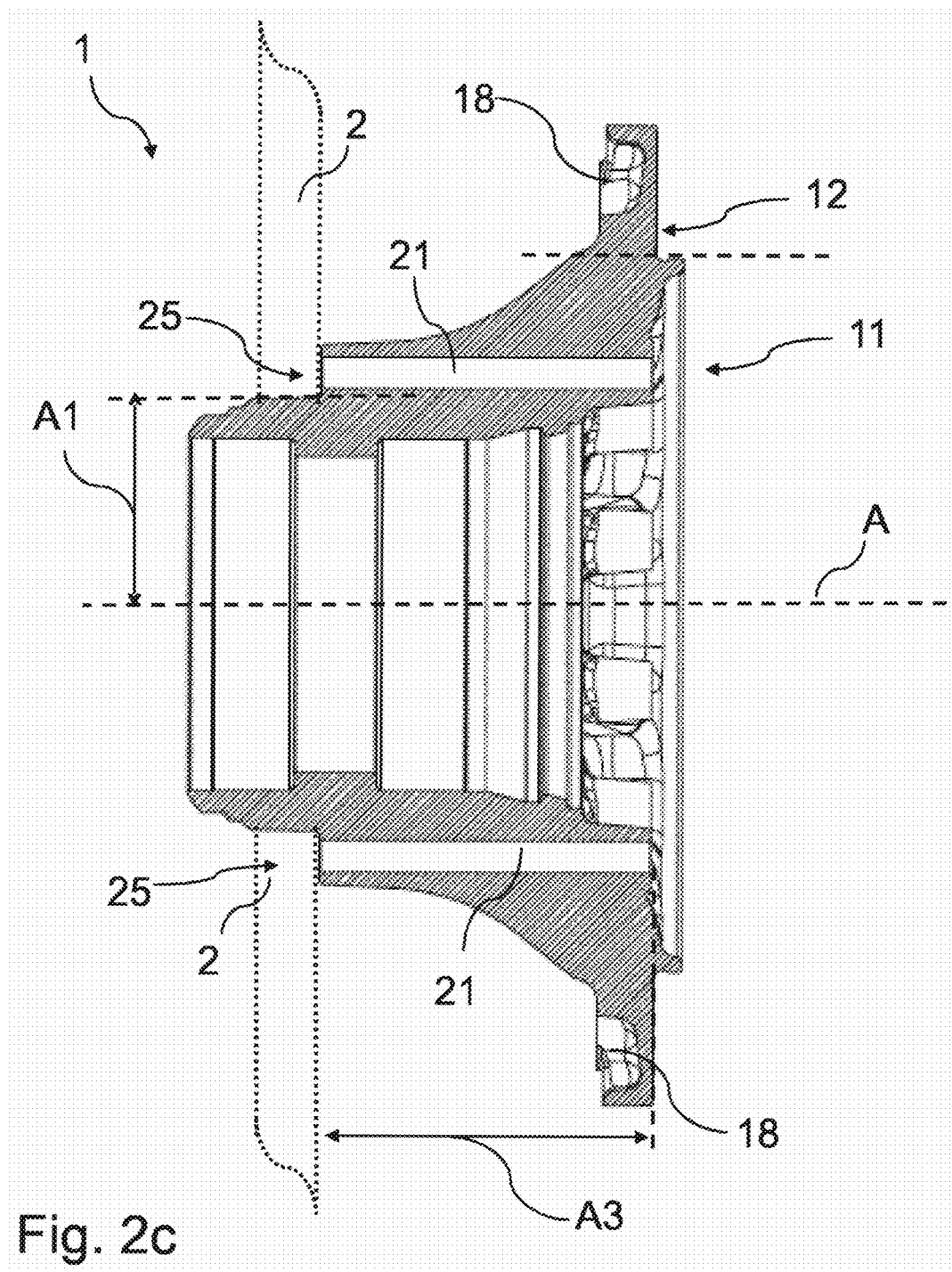

FIGS. 2a1 to 2c illustrate a wheel hub 1 according to a second exemplary embodiment of the present invention. FIGS. 2a1 and 2a2 illustrate two perspective views, FIGS. 2b1 and 2b2 in each case a top view of a rear side (on the left) and a front side (on the right) of the wheel hub 1 and FIG. 2c a sectional view. The embodiment illustrated in FIGS. 2a1 to 2c differs essentially from the embodiment from FIGS. 2a to 2c to the effect that a primary recess 21 is assigned in each case to each rib element 5. Furthermore, it is provided that the primary recess 21 at least partially extends in a sleeve-shaped partial region 26 which protrudes from the rib element 5. The sleeve-shaped partial region 26 protrudes here in the axial direction from the rib element 5 in the direction of the collar region 12. Furthermore, it is provided that the clear regions 15 between two adjacent rib elements 5, as seen in the radial direction, are each arranged congruently or along a line with the secondary recesses 22. Furthermore, it is provided that a respective brake disk contact surface 25 is to be assigned to each first opening of the primary recesses 21. As can be gathered from FIG. 2c, the second opening ends flush with an outer side of the collar region 12, as seen in the axial direction.

Figure 3C:
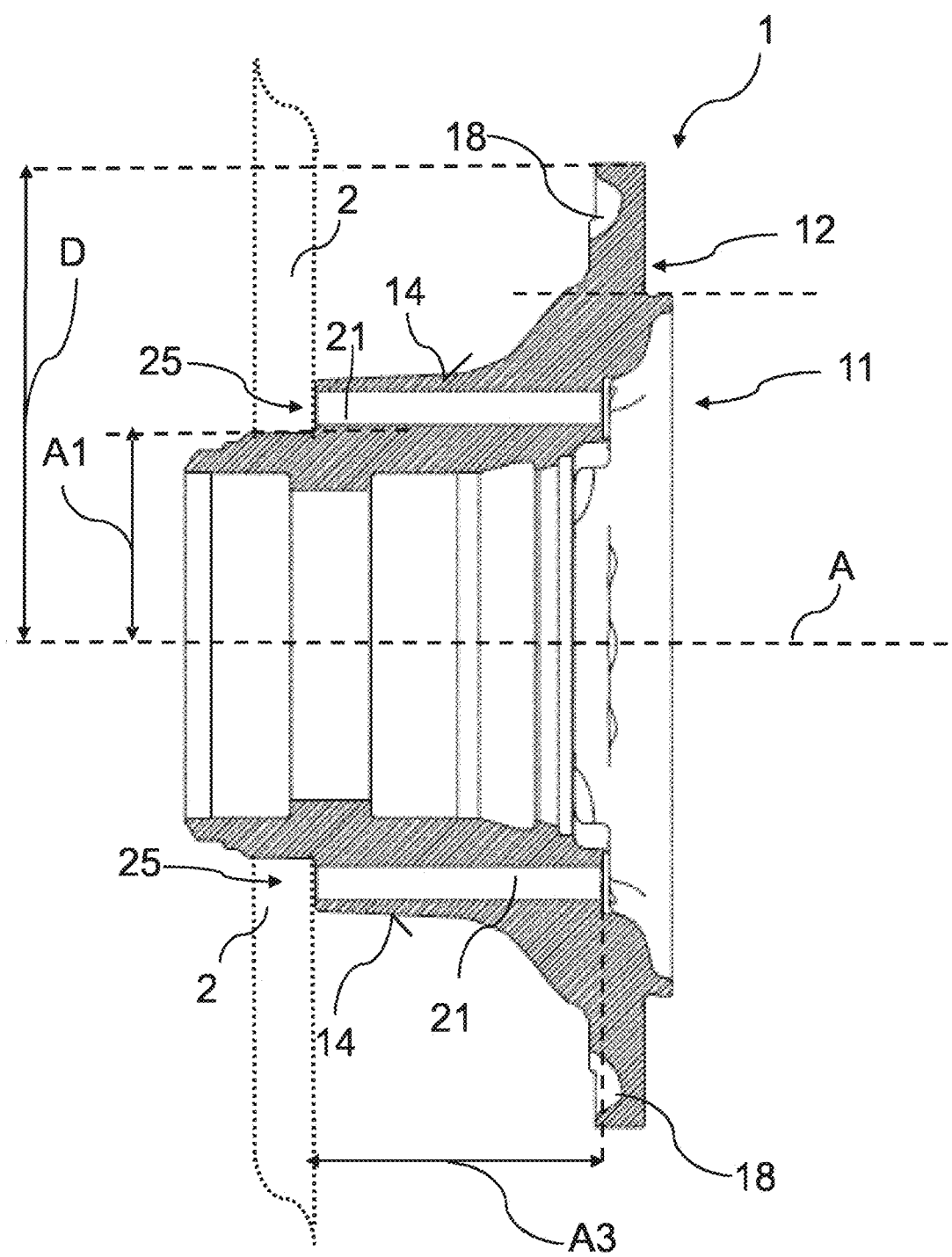

FIGS. 3a1 to 3c illustrate a wheel hub 1 according to a second exemplary embodiment of the present invention. FIGS. 3a1 and 3a2 illustrate two perspective views, FIGS. 3b1 and 3b2 in each case illustrates a top view of a rear side (on the left) and a front side (on the right) of the wheel hub 1 and FIG. 3c illustrates a sectional view. The embodiment substantially corresponds to that from FIGS. 1a to 1c without the rib elements 5 being textured.

Figure 4C:
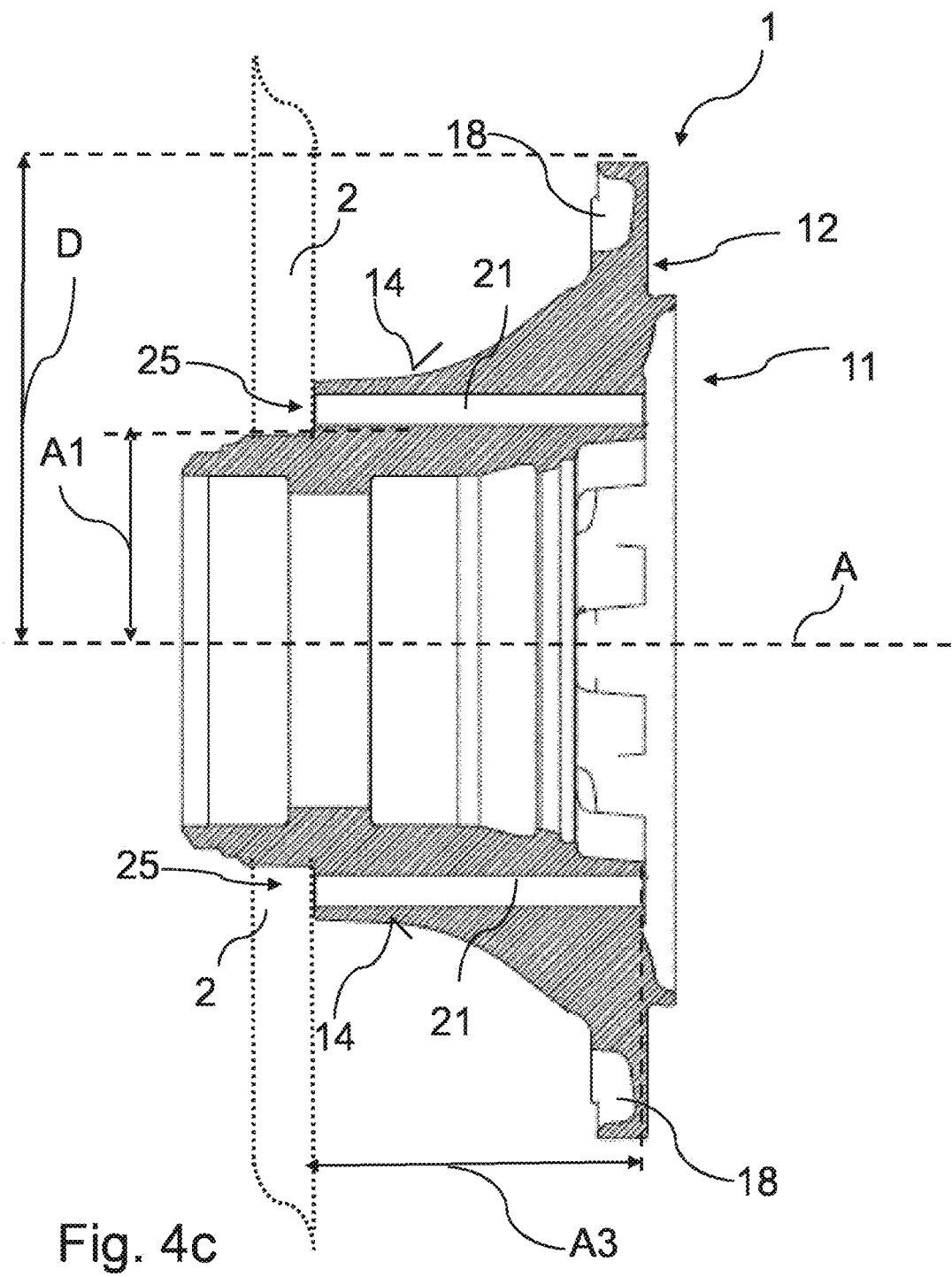

FIGS. 4a1 to 4c illustrate a wheel hub 1 according to a second exemplary embodiment of the present invention. FIGS. 4a1 and 4a2 illustrate two perspective views, FIGS. 4b1 and 4b2 in each case illustrates a top view of a rear side (on the left) and a front side (on the right) of the wheel hub 1 and FIG. 4c illustrates a sectional view. The embodiment substantially corresponds to that from FIGS. 2a to 2c without the rib elements 5 being textured.

REFERENCE SIGNS

1 Wheel hub
2 Brake disk
5 Rib element
11 Core region
12 Collar region
15 Clear region
18 Material thinning
21 Primary recess
22 Secondary recess
25 Brake disk contact surface
26 Sleeve-shaped partial region
A Axis of rotation
A1 Distance between the axis of rotation and the primary recess
A2 Distance between the axis of rotation and lateral outer side
A3 Length of the extent of the primary recess
U Revolving direction
D Radius

The invention claimed is:

1. A wheel hub, comprising:
an outer collar region, as seen in a radial direction; and
an inner core region, as seen in the radial direction;
wherein the inner core region has a greater extent in an axial direction than the outer collar region;
wherein, in the inner core region, the wheel hub has a substantially axially running primary recess for the connection of a brake disk;
wherein a ratio between a radial distance between an axis of rotation and the primary recess and a radius of the wheel hub is between 0.6 and 0.3;
wherein the primary recess completely penetrates the wheel hub; and
wherein the primary recess opens toward one side in a brake disk contact surface and wherein the brake disk contact surface is interrupted, as seen in a revolving direction.

2. The wheel hub as claimed in claim 1, wherein the core region comprises substantially radially running rib elements.

3. The wheel hub as claimed in claim 2, wherein the rib elements connect the core region to the collar region.

4. The wheel hub as claimed in claim 2, wherein each rib element has only one primary recess.

5. The wheel hub as claimed in claim 1, wherein a ratio between an extent of the primary recess, as measured in the axial direction, to an overall extent of the wheel hub in the axial direction is between 0.5 and 0.98.

6. The wheel hub as claimed in claim 5, wherein the ratio between the extent of the primary recess to the overall extent of the wheel hub is between 0.75 and 0.95.

7. The wheel hub as claimed in claim 6, wherein the ratio between the extent of the primary recess to the overall extent of the wheel hub is between 0.8 and 0.93.

8. The wheel hub as claimed in claim 1, wherein the ratio is between 0.55 and 0.35.

9. The wheel hub as claimed in claim 8, wherein the ratio is between 0.4 and 0.5.

10. The wheel hub as claimed in claim 1, wherein a clear region is arranged between two rib elements, as seen in a revolving direction.

11. The wheel hub as claimed in claim 10, wherein an area of the rib elements measured in the revolving direction is 0.3 to 0.5 times as large as an area of the clear region.

12. The wheel hub as claimed in claim 1, wherein the outer collar region has a secondary recess, and wherein the primary recess extends further in the axial direction than the secondary recess.

13. The wheel hub as claimed in claim 1, wherein the primary recess is arranged offset in a revolving direction with respect to a secondary recesses.

14. The wheel hub as claimed in claim 1, wherein the primary recess, as seen in the radial direction, extends over the entire length of a rib element, or wherein the primary recess is at least partially formed by a sleeve-shaped partial region which protrudes from a rib element in the axial direction.

15. The wheel hub as claimed in claim 1, wherein the primary recess opens toward one side in a brake disk contact surface, and wherein the brake disk contact surface is continuous, as seen in a revolving direction.

16. A system comprising a brake disk and a wheel hub as claimed in claim 1, wherein the brake disk is connectable to a brake disk contact surface, by a fastener guided through the primary recess.

17. A method for mounting a brake disk on a wheel hub, as claimed in claim 1, comprising:
providing a wheel hub as claimed in claim 1;
introducing a fastener into the primary recess; and
connecting the brake disk to the wheel hub by the fastening assembly.

* * * * *